United States Patent
Keronen (10) Patent No.: US 6,559,968 B1
(45) Date of Patent: May 6, 2003

(54) COPYING SELECTED REGIONS OF DOCUMENTS

(75) Inventor: Seppo Reino Keronen, Eastwood (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/334,182

(22) Filed: Jun. 16, 1999

(30) Foreign Application Priority Data

Jun. 19, 1998 (AU) .............................................. PP4247

(51) Int. Cl.$^7$ .............................................. G06K 15/00
(52) U.S. Cl. ...................................... 358/1.18; 358/1.1
(58) Field of Search .............................. 358/1.1, 1.18, 358/1.16, 1.2; 400/708, 703, 705, 706, 1.3; 382/317, 293, 295; 345/441, 563, 629; 707/517, 520, 515, 516

(56) References Cited

U.S. PATENT DOCUMENTS

| 4,241,415 | A | * | 12/1980 | Masaki et al. ............... 345/441 |
| 4,351,547 | A | | 9/1982 | Brooks, II ................. 283/8 R |
| 5,038,392 | A | * | 8/1991 | Morris et al. ............... 382/175 |
| 5,085,529 | A | * | 2/1992 | McGourty et al. ..... 400/120.13 |

FOREIGN PATENT DOCUMENTS

| DE | 42 16 893 | 11/1992 |
| DE | 196 06 398 | 8/1997 |
| DE | 196 18 501 | 11/1997 |
| EP | 0 642 060 | 3/1995 |
| EP | 0 647 057 | 4/1995 |
| JP | 6-171149 | 6/1994 |
| JP | 8-30746 | 2/1996 |
| JP | 9-23333 | 1/1997 |
| WO | WO 84/04864 | 12/1984 |

* cited by examiner

Primary Examiner—Arthur G. Evans
(74) Attorney, Agent, or Firm—Fitzpatrick, Cella, Harper & Scinto (57) ABSTRACT

Disclosed is a method for selective copying of regions of a printed sheet (101). The printed sheet (101) comprises a plurality of said regions (111,112,113, and 114) having recorded therein associated text and/or graphics. The printed sheet (101) also includes information (202,204,206,208) stored on said printed sheet indicating the location of the regions. The method comprises a reading step (304), a selecting step (302), and a copying step (308). In the reading step (304), the method reads the information stored on said printed sheet indicating the location of the regions. In the selection step (302), a user selects one or more desired regions and associated text and/or graphics for copying. In the copying step (308), the method copies the selected regions and associated text and/or graphics in accordance with said information.

65 Claims, 7 Drawing Sheets

COPYING SELECTED REGIONS OF DOCUMENTS

TECHNICAL FIELD

The invention relates to a method for copying or blocking regions of a printed sheet. The invention also relates to a method of printing text and/or graphics. The invention further relates to an apparatus and a computer program product for implementating any one of the methods. The invention also relates to a sheet for use in the methods.

BACKGROUND

Photocopiers and optical scanners are well known. A user of such apparatus may desire to copy/scan only certain portions of a document, while not copying/scanning the remaining portions. In practice, the user blanks out those portions he does not want copied/scanned by overlaying the portions with a blank sheet of paper. Thus when the user photocopies or scans the document only those portions that are not overlayed are effectively photocopied/scanned. The remaining overlayed portions are photocopied/scanned as blanked portions. This is a cumbersome and time-consuming process.

SUMMARY OF THE INVENTION

It is an object of the invention to ameliorate one or more disadvantages of the prior art.

According to one aspect of the invention, there is disclosed a method of copying regions of a printed sheet, the printed sheet comprising a plurality of said regions having recorded therein associated text and/or graphics and information stored on said printed sheet indicating the location of the regions, the method comprising the steps of: (i) reading said information stored on said printed sheet indicating the location of the regions; (ii) selecting one or more of said regions and associated text and/or graphics for copying; and (iii) copying said selected regions and associated text and/or graphics in accordance with said information.

According to another aspect of the invention, there is disclosed a method of blocking regions of a printed sheet, the printed sheet comprising a plurality of said regions having recorded therein associated text and/or graphics and information stored on said printed sheet indicating the location of the regions, the method comprising the steps of: (i) reading said information stored on said printed sheet indicating the location of the regions; (ii) selecting one or more of said regions and associated text and/or graphics for blocking; and (iii) blocking said selected regions and associated text and/or graphics in accordance with said information.

According to still another aspect of the invention, there is apparatus for copying regions of a printed sheet, the printed sheet comprising a plurality of said regions having recorded therein associated text and/or graphics and information stored on said printed sheet indicating the location of the regions, the apparatus comprising: means for reading said information stored on said printed sheet indicating the location of the regions; means for selecting one or more of said regions and associated text and/or graphics for copying; and means for copying said selected regions and associated text and/or graphics in accordance with said information.

According to still another aspect of the invention, there is apparatus for blocking regions of a printed sheet, the printed sheet comprising a plurality of said regions having recorded therein associated text and/or graphics and information stored on said printed sheet indicating the location of the regions, the apparatus comprising: means for reading said information stored on said printed sheet indicating the location of the regions; means for selecting one or more of said regions and associated text and/or graphics for blocking; and means for blocking said selected regions and associated text and/or graphics in accordance with said information.

According to still another aspect of the invention, there is disclosed a computer program product comprising a computer readable medium having recorded thereon a computer program for copying regions of a printed sheet, the printed sheet comprising a plurality of said regions having recorded therein associated text and/or graphics and information stored on said printed sheet indicating the location of the regions, the apparatus comprising: means for reading said information stored on said printed sheet indicating the location of the regions; means for selecting one or more of said regions and associated text and/or graphics for copying; and means for copying said selected regions and associated text and/or graphics in accordance with said information.

According to still another aspect of the invention, there is disclosed a computer program product comprising a computer readable medium having recorded thereon a computer program for blocking regions of a printed sheet, the printed sheet comprising a plurality of said regions having recorded therein associated text and/or graphics and information stored on said printed sheet indicating the location of the regions, the apparatus comprising: means for reading said information stored on said printed sheet indicating the location of the regions; means for selecting one or more of said regions and associated text and/or graphics for blocking; and means for blocking said selected regions and associated text and/or graphics in accordance with said information.

According to still another aspect of the invention, there is disclosed a method of printing text and/or graphics, the method comprising the steps of: displaying an image of a document having a plurality of regions; selecting one or more of said regions of the displayed document; inputting text and/or graphics for display in the selected regions of the document; and printing said displayed document together with information indicating the location of the regions.

According to still another aspect of the invention, there is apparatus for printing text and/or graphics, the apparatus comprising: means for displaying an image of a document having a plurality of regions; means for selecting one or more of said regions of the displayed document; means for inputting text and/or graphics for display in the selected regions of the document; and means for printing said displayed document together with information indicating the location of the regions.

According to still another aspect of the invention, there is disclosed a computer program product comprising a computer readable medium having recorded thereon a computer program for printing text and/or graphics, the computer program product comprising: means for displaying an image of a document having a plurality of regions; means for selecting one or more of said regions of the displayed document; means for inputting text and/or graphics for display in the selected regions of the document; and means for printing said displayed document together with information indicating the location of the regions.

According to still another aspect of the invention, there is disclosed a method of printing text and/or graphics on a sheet, the sheet comprising a plurality of regions adapted to record therein associated text and/or graphics and information thereon indicating the location of the regions, the method comprising the steps of: selecting one or more of said regions for inputting text and/or graphics; inputting the text and/or graphics; and printing the text and/or graphics in the user selected regions.

According to still another aspect of the invention, there is apparatus for printing text and/or graphics on a sheet, the sheet comprising a plurality of regions adapted to record therein associated text and/or graphics and information thereon indicating the location of the regions, the apparatus comprising: means for selecting one or more of said regions for inputting text and/or graphics; means for inputting the text and/or graphics; and means for printing the text and/or graphics in the user selected regions.

According to still another aspect of the invention, there is provided a computer program product comprising a computer readable medium having recorded thereon a computer program for printing text and/or graphics on a sheet, the sheet comprising a plurality of regions adapted to record therein associated text and/or graphics and information thereon indicating the location of the regions, the computer program product comprising: means for selecting one or more of said regions for inputting text and/or graphics; means for inputting the text and/or graphics; and means for printing the text and/or graphics in the user selected regions.

According to still another aspect of the invention, there is provided a printed sheet having text and/or graphics recorded thereon, the printed sheet comprising: a plurality of regions having recorded therein associated text and/or graphics; and information stored on said printed sheet indicating the location of the regions.

According to still another aspect of the invention, there is a method of copying a printed sheet, said printed sheet comprising a plurality of regions each identified by indicia incorporated upon said sheet, at least one of said regions including information recorded therein, said method comprising the steps of: (i) reading said indicia from said printed sheet to identify said regions; (ii) selecting at least one of said regions for copying, said selection thereby establishing a set of said regions of said printed sheet not desired for copying; and (iii) copying said printed sheet by copying information recorded on said print sheet except information contained in said set of regions.

BRIEF DESCRIPTION OF THE DRAWINGS

Embodiments of the various aspects of the invention are described below by way of example only, with reference to the accompanying drawings, in which.

DETAILED DESCRIPTION OF THE PREFERRED EMBODIMENTS

Figure 1A:
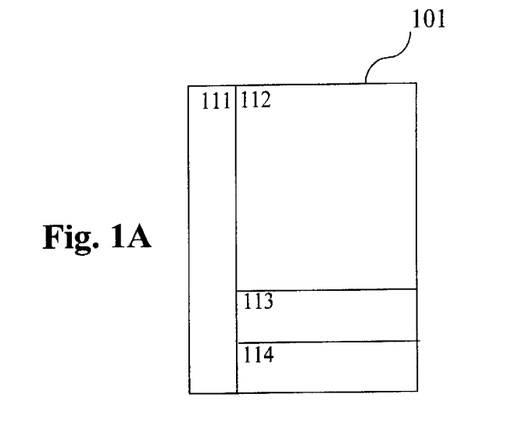
FIG. 1A illustrates an example of a specially prepared sheet of paper in accordance with the preferred embodiment.
Figure 1B:
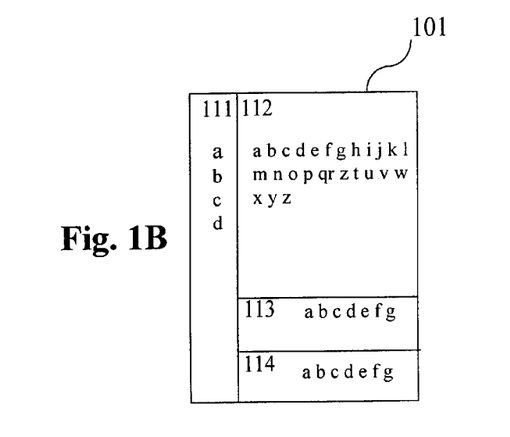
FIG. 1B illustrates the same sheet of paper as shown in FIG. 1A, except that it has text and/or graphics printed thereon.

FIG. 1A shows an example of a single sheet of paper 101 that has been specially prepared to allow selective copying. FIG. 1B shows the same sheet of paper to that shown in FIG. 1A, except that the paper 101 has text and/or graphics printed thereon. The sheet of paper 101 shown in FIGS. 1A and 1B is divided into a number of regions 111, 112, 113 and 114. The regions 111, 112, 113 and 114 each include a distinctive and different pattern (see FIG. 2). The distinctive patterns cover the entire regions and enable each region 111, 112, 113 and 114 to be recognised and distinguished from one another by a computer system 600 of the type shown in FIG. 6. The patterns covering the regions 111, 112, 113 and 114 are pre-assigned as selective copying patterns. These selective copying patterns enable a user to select one or more regions 111, 112, 113 and 114 of the printed document 101 (FIG. 1B) for copying. The user is able to copy portions of the text and/or graphics on the document 101 by selecting corresponding one or more regions 111, 112, 113 and 114. Preferably, the selective copying regions are not copied unless specifically selected by a user. Alternatively, the selective copying regions are by default copied. In the latter embodiment, the user selects those regions desired to be blocked, that is not to be copied. In the latter case, the selective copying regions are in effect selective blocking regions.

In still another embodiment, it may be preferable to pre-assign a pattern as a blocking pattern to prevent copying. For example, the pattern shown in region 114 can be pre-assigned as a blocking pattern for preventing the photocopying of any associated text and/or graphics printed in the region 114. The preferred method is then able to recognise the blocking pattern in region 114 and in response thereto blocks the copying of any text and/or graphics in the region 114. The user is unable to override this blocking operation and thus cannot copy any text and/or graphics occurring in the region 114 of paper 102 (FIG. 1B).

In the example shown in FIG. 1, the distinctive patterns cover the entire sheet of paper. However, in some circumstances, it may be preferable that some regions of the paper may be left blank. That is some regions include no distinctive patterns. In these circumstances, the text and/or graphics in the 'blank' regions will always be copied. In a still further embodiment, a pattern of a region may be pre-assigned as a copying pattern. In these circumstances, the text and/or graphics in the regions having the copying patterns will always be copied. The user is unable to override this copying action. These blank regions and regions having a copying pattern in effect perform the same function.

Figure 2:
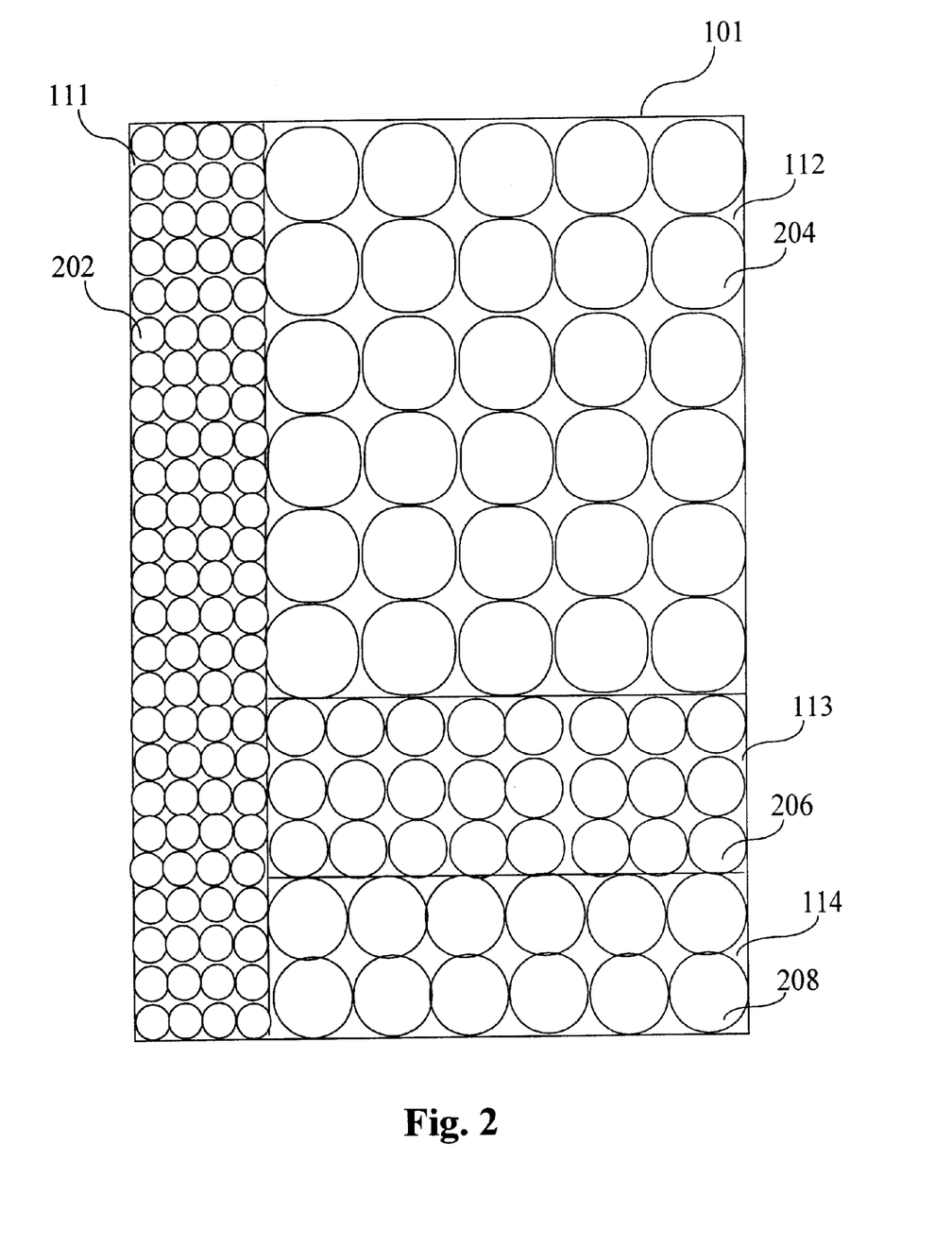
FIG. 2 illustrates the paper of FIG. 1A in more detail.

FIG. 2 shows the specially prepared paper 101 of FIG. 1A in more detail. As seen, regions 111, 112, 113, and 114 each have respective circular patterns 202, 204, 206 and 208 of solid colour. The regions 111, 112, 113 and 114 are distinguished from one another by the size of the circles constituting each of the respective patterns 202, 204, 206, and 208. The computer system 600 when performing copying or scanning is configured to determine the size of the circles and thus distinguish between the regions 111, 112, 113 and 114 of the paper 101. The circles of the patterns 202, 204, 206 and 208 provide for rotational invariance, which assists in the reliable detection of the patterns by the computer system 600. This is desirable as the page may not be perfectly rotationally aligned when copied or scanned. Preferably, the patterns are printed in yellow ink to avoid disturbing the appearance of the document. Alternatively, other patterns, such as colour difference or different arrangement of parts of a pattern may be used to distinguish the regions to be copied.

Preferably, the patterns themselves are visible to the human eye and the computer system 600 has a keyboard with the same patterns printed on the keys. The user is then able to select the desired region for copying by pressing the appropriate key having the associated pattern. Alternatively, the patterns may be invisible to the human eye. For example, the circular patterns may be printed on the paper 101 with infrared detectable inks. In the latter embodiment, the regions are recognised by the user by virtue of a visible number printed in the region. The user selects the desired region(s) for copying by pressing an appropriate number on an alphanumeric keyboard of the computer system 600. To assist the user in the visual recognition of the regions a visible border may be printed around the regions 111, 112, 113 and 114.

The specially prepared paper in accordance with the preferred embodiment may take the form of many different shapes and sizes (A4, A3 etc) and have a varying number and geometric arrangements of regions without departing from the spirit and scope of the invention. The shape, size, number and geometric arrangement of regions shown in paper 101 are exemplary and are for the purposes of explanation only.

Figure 1C:
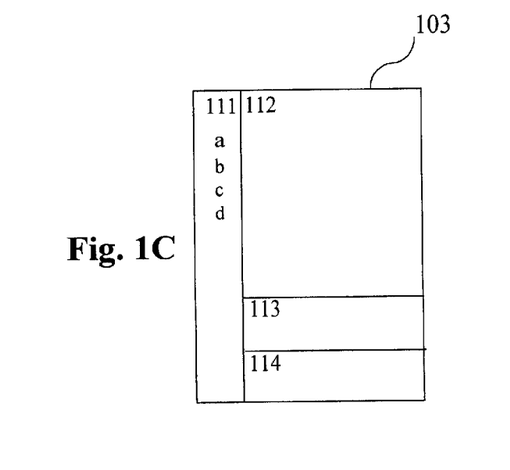
FIG. 1C illustrates a photocopy of the sheet of paper shown in FIG. 1B.
Figure 3:
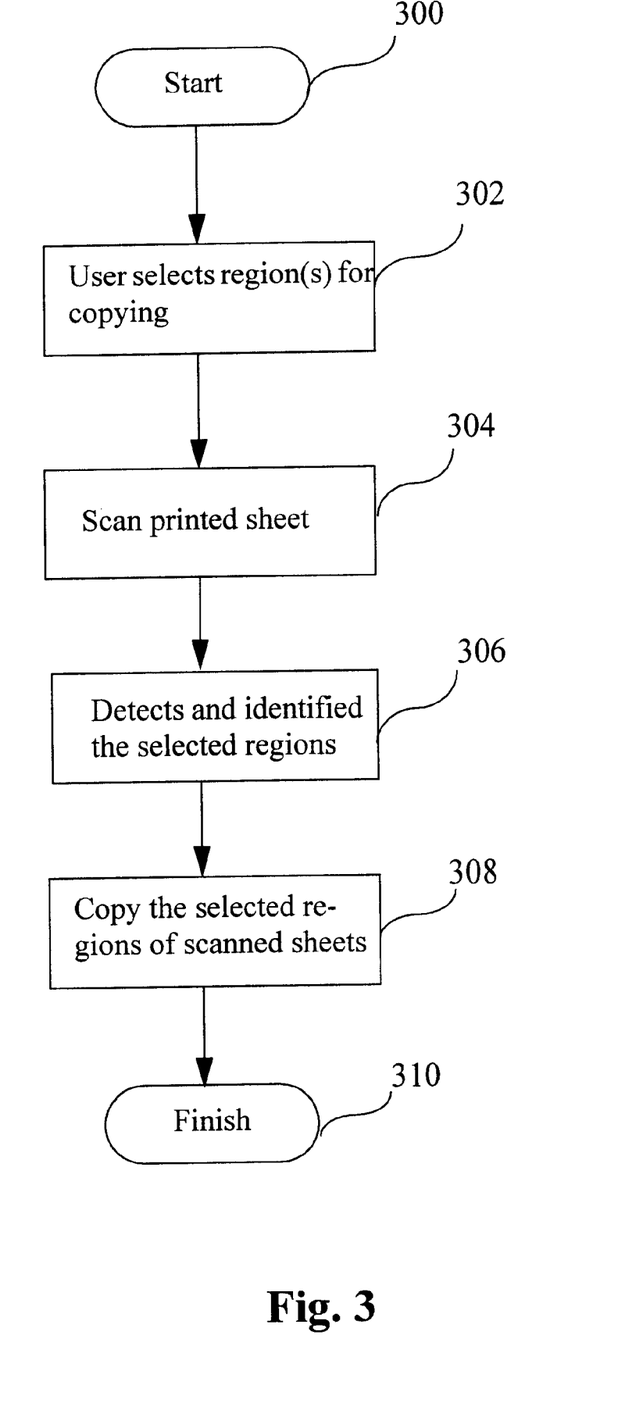
FIG. 3 is a flow diagram illustrating a method for copying selecting regions of a printed sheet in accordance with the preferred embodiment.

FIG. 3 shows a flow diagram of a method for copying selected regions of a printed sheet in accordance with a preferred embodiment. For ease of explanation, the method is described with reference to one particular example of copying and is not intended to be limited thereto. In this example, a user wishes to copy only the text and/or graphics printed in the region 111 of paper 101. In step 300 of the method, the processing commences and the computer system 600 is initialised. In step 302, the user selects the region(s) of the printed sheet desired to be copied and inputs this information via a keyboard of the computer system 600. Namely, in this particular example, the user selects the region 111 and inputs this information via the keyboard. In step 304, the computer system 600 scans the printed sheet and in step 306 detects and identifies the selected region(s), eg. 111. Alternatively, the printed sheet may be firstly scanned and displayed by the computer 600 and afterwards the user may select the desired region(s) for copying. The computer system 600 in step 308, then copies the selected region(s), eg. region 111, together with its associated text and/or graphics printed therein. This is achieved through detecting the particular pattern within the region 111. The computer system 600 does not copy, ie. blocks, the remaining regions,112, 113 and 114, as those do not correspond with the selected pattern, resulting in the photocopied document 103 (FIG. 1C). This selective copying method enables certain region(s) of a page to be copied, whilst the rest of the page is not copied. Thus certain text and/or graphics can be removed or concealed for legal, commercial, or other private or security reasons. The processing is finished at step 310.

Figure 4:
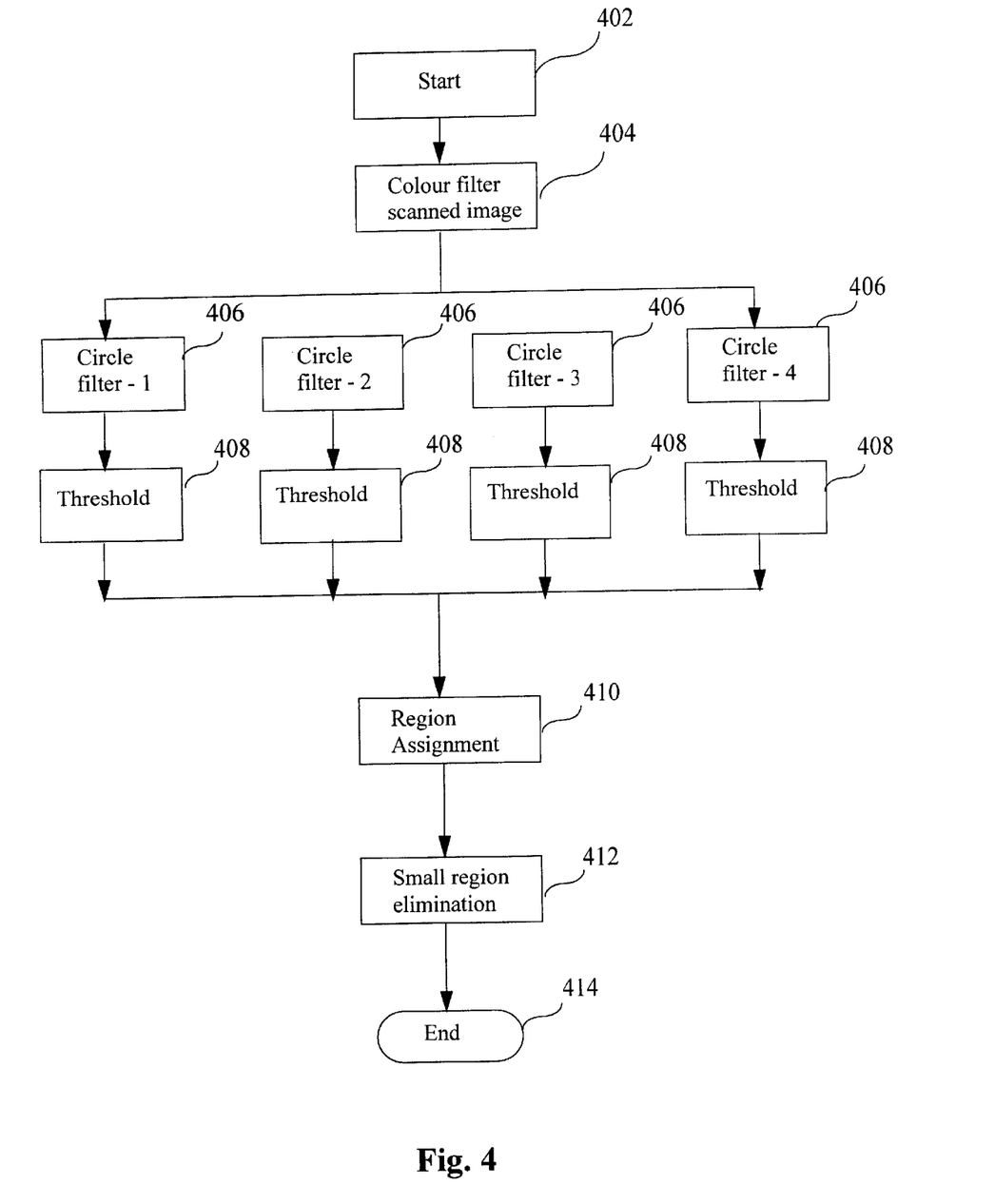
FIG. 4 is a flow diagram illustrating the step of detecting regions in FIG. 3.

FIG. 4 shows the preferred method for detecting the regions for use in step 306 of FIG. 3. This detection process is utilised in identifying regions on a sheet having patterns of the type illustrated in FIG. 2. In step 402, the process of detecting the patterns in the regions of the scanned image commences. In step 404, the scanned image is digitally colour filtered so as to extract the yellow channel of the scanned image. In step 406, the colour filtered scanned image is fed to a series of digital filters that each respond to a particular size of circle. These digital filters are utilised to produce images that have high filter response values in the regions where the circles of the specified size are present. In step 408, the circular filtered images are fed to a threshold to produce binary images having binary pixels where one indicates the presence of a yellow circle of a particular size and zero indicating otherwise. In step 410, a region assignment process assigns a region class to each pixel of the scanned images. The region assignment process determines the region of a pixel of the scanned image by determining which binary image, supplied by step 408, has a one closest to that pixel. In the case of a conflict, an arbitrary choice among the region classes may be made. This region assignment process may result in small, irregularly shaped, regions of mis-assignment, for example; ragged boundaries between regions and even small closed regions of mis-assignment. In step 412, a small region elimination process re-assigns pixels in such regions to a class of a surrounding region. In particular, small digital regularisation filters can be applied so as to provide straight boundaries. Also, if the size of the regions are constrained to be larger than a known minimum value (eg. 1 cm), then regularisation filters can be applied to eliminate regions of mis-assignment that are much smaller than this value. In step 414, the processing finishes resulting in a region classification image formed of an two dimensional array of pixels each having an integer value indicating the class of the corresponding pixel in the original scanned image. Or in other words, each pixel of the scanned image has associated with it an integer value indicating the region to which it belongs. It is in this way that the desired region(s) may be identified and copied.

Figure 5:
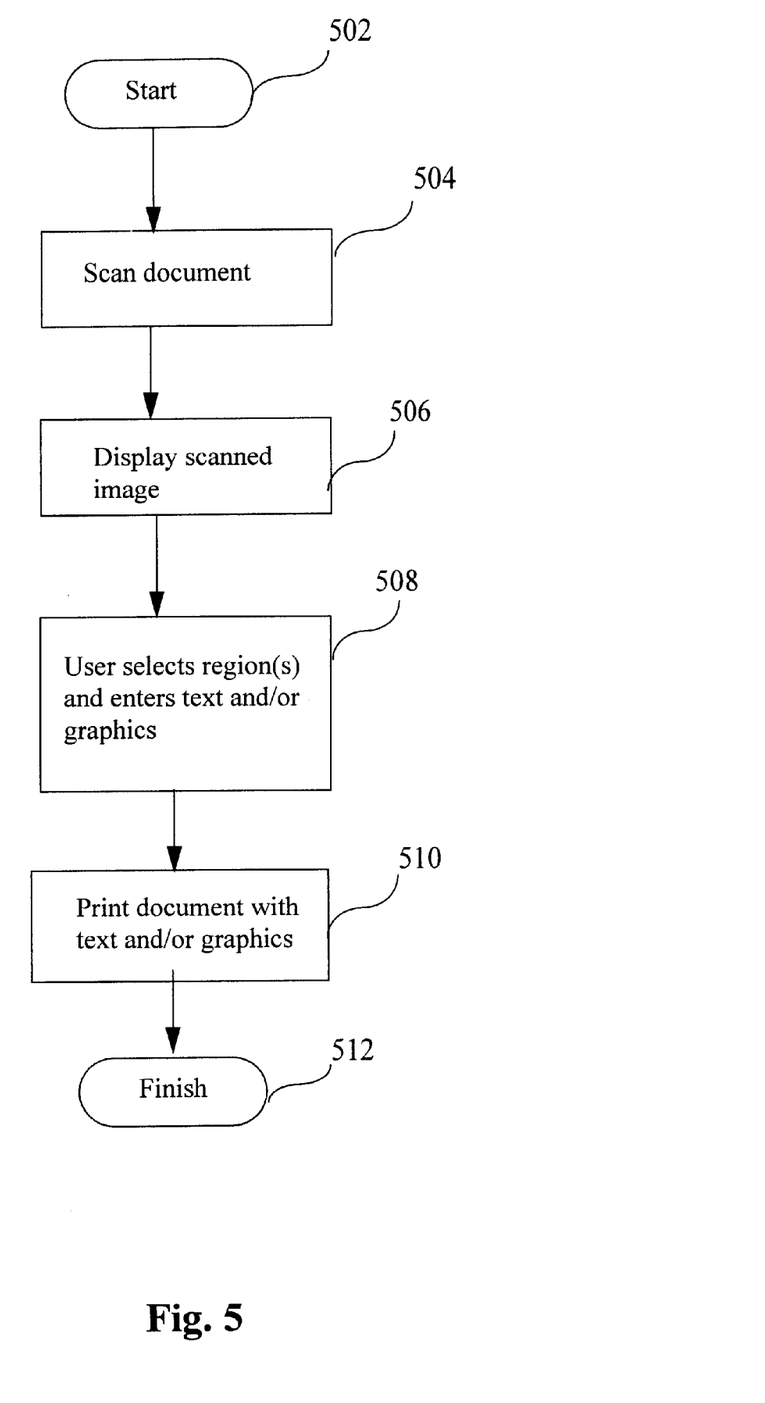
FIG. 5 is a flow diagram illustrating a method for printing in accordance with a preferred embodiment.

FIG. 5 shows a flow diagram of a method for printing text and/or graphics on a specially prepared sheet of paper in accordance with a preferred embodiment. The process commences at step 502. In step 504, a specially prepared sheet of paper, such as one shown in FIG. 1A is fed into and scanned by a scanner. In step 506, the scanned image is displayed on a video monitor. In step 508, the user selects one or more region(s) of the displayed image via input means and enters text and/or graphics via a keyboard or other means. During the scanning process, the method detects and identifies the locations of the regions of the specially prepared paper in a similar manner to that described with reference to FIG. 4. Alternatively, the method detects and identifies the locations of the regions by means of a barcode located on the specially prepared paper. The entered text and/or graphics is then able to be displayed on the video monitor in the selected region(s) in a WYSIWYG manner. In step 510, the displayed document having the entered text and/or graphics in the selected region(s) is printed, together with information indicating the location of the printed regions. This information may be in the form of that described with reference to FIG. 2 or FIG. 7, viz. solid circles or bar codes. The processing terminates at step 512. Alternatively, the method may use plain paper, and instead of scanning the paper, the method prints the unique patterns for each of the regions in addition to the entered text and/or graphics for those regions. Initially, an image is displayed of the sheet and its regions. The user then enters in WYSIWYG manner the desired text and/or graphics in the chosen regions. The image containing the text and/or graphics is then combined with an image of the patterns (or barcode) in a known manner, prior to the printing step. Thus negating the need for two printing steps.

Figure 6:
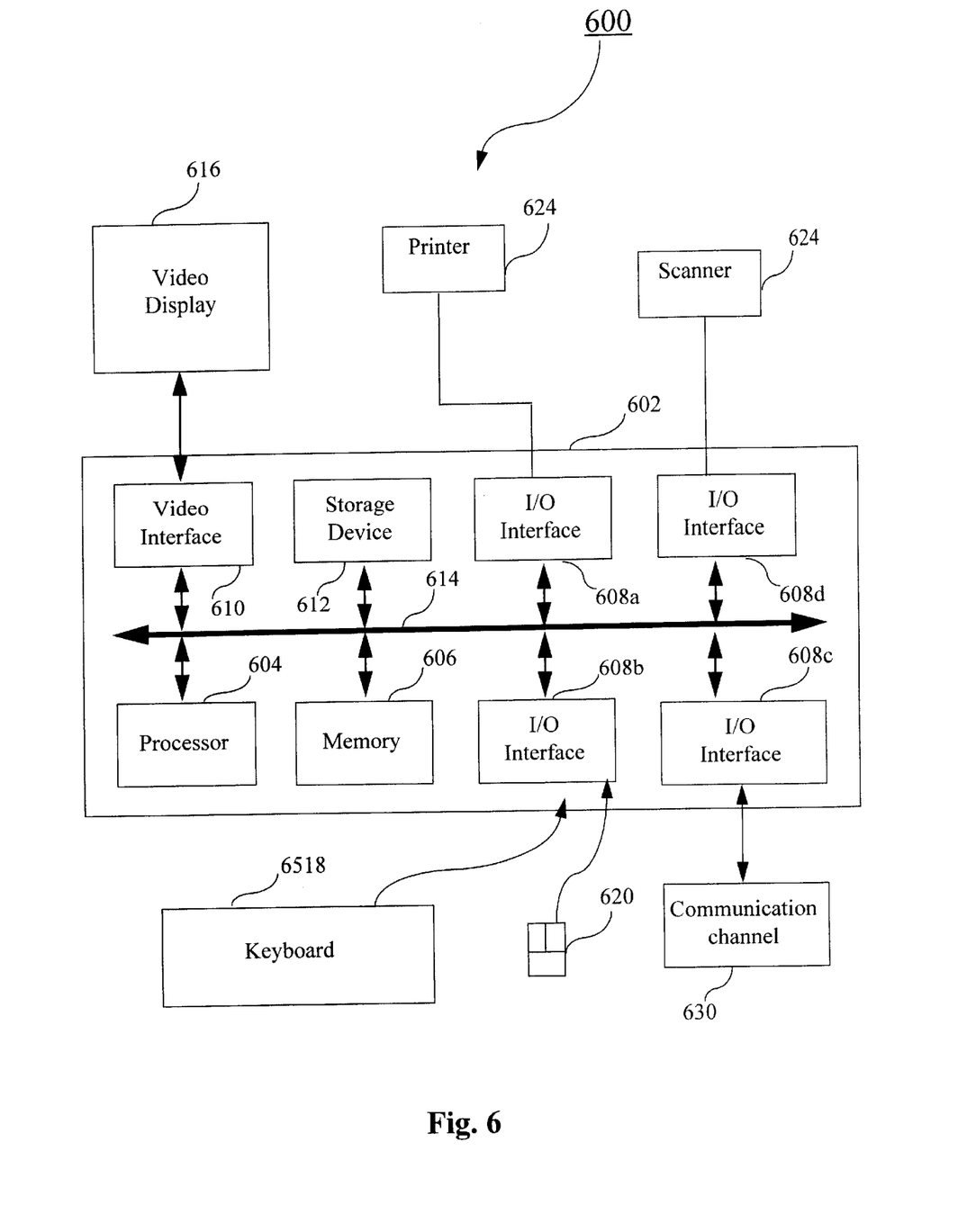
FIG. 6 illustrates a block diagram of a computer system in accordance with the preferred embodiment.

The copying and printing processes can be practised using a conventional general-purpose computer, such as the one shown in FIG. 6, wherein the processes of FIGS. 3 and 4 or FIG. 5 may be implemented as software executing on the computer. In particular, the steps of the printing and/or copying methods are effected by instructions in the software that are carried out by the computer. The software can be divided into two separate parts; one part for carrying out the printing and/or copying methods; and another part to manage the interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous an apparatus for printing text and/or graphics on a sheet in accordance with the embodiments of the invention.

The computer system 600 includes the computer 602, a video display 616, input devices 618, 620, and printer 622 and scanner 624. In addition, the computer system 600 can have any of a number of other output devices. The computer system 600 can be connected to one or more other computers via a communication interface 608c using an appropriate communication channel 630 such as a modem communications path, a computer network, or the like. The computer network may include a local area network (LAN), a wide area network (WAN), an Intranet, and/or the Internet.

The computer 602 itself includes a central processing unit(s) (simply referred to as a processor hereinafter) 604, a memory 606 which may include random access memory (RAM) and read-only memory (ROM), input/output (IO) interfaces 608a, 608b and 608c, a video interface 610, and one or more storage devices generally represented by a block 612 in FIG. 6. The storage device(s) 612 can include one or more of the following: a floppy disc, a hard disc drive, a magneto-optical disc drive, CD-ROM, magnetic tape or any other of a number of non-volatile storage devices well known to those skilled in the art. Each of the components 604 to 612 is typically connected to one or more of the other devices via a bus 614 that typically includes data, address, and control buses.

The video interface 610 is connected to the video display 616 and provides video signals from the computer 602 for display on the video display 616. User input to operate the computer 602 can be provided by one or more input devices 608b. For example, an operator can use the keyboard 618 and/or a pointing device such as the mouse 620 to provide input to the computer 602.

The system 600 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 612 in FIG. 6) as the computer readable medium, and read and controlled using the processor 604. Intermediate storage of the program and pixel data and any data fetched from the network may be accomplished using the semiconductor memory 606, possibly in concert with the hard disk drive 612.

In some instances, the program may be supplied to the user encoded on a CD-ROM or a floppy disk (both generally depicted by block 612), or alternatively could be read by the user from the network via a modem device connected to the computer, for example. Still further, the software can also be loaded into the computer system 600 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of copying and printing may alternatively be implemented as one or more integrated circuits performing the functions or subfunctions of the selective copying and printing methods. For example, the digital filters of the detecting step may be implemented as separate integrated circuits and interfaced with the processor 604.

Alternatively, the method of selectively copying can be implemented as dedicated hardware in form of, for example, a photocopier. Such a photocopier can incorporate a computer system substantially the same as that described with reference to FIG. 6. The main difference being in its outward appearance and mechanical feeders. Moreover, such a photocopier may not need a storage device 612 and a communication channel 630. In such a case, the software for implementing the copying method is preferably stored in a ROM. In addition, the photocopier can have, instead of a QWERTY keyboard, a dedicated keyboard having keys representing specialised copying functions and keys having the above mentioned patterns thereon. The user is then able to select the desired region for copying by pressing the appropriate key having the associated pattern. The photocopier may also have a small LCD display instead of a video display. Where a reference is made in this description to the computer system 600, it is also intended to include a reference to the above mentioned photocopier, unless the contrary intention appears.

Figure 7:
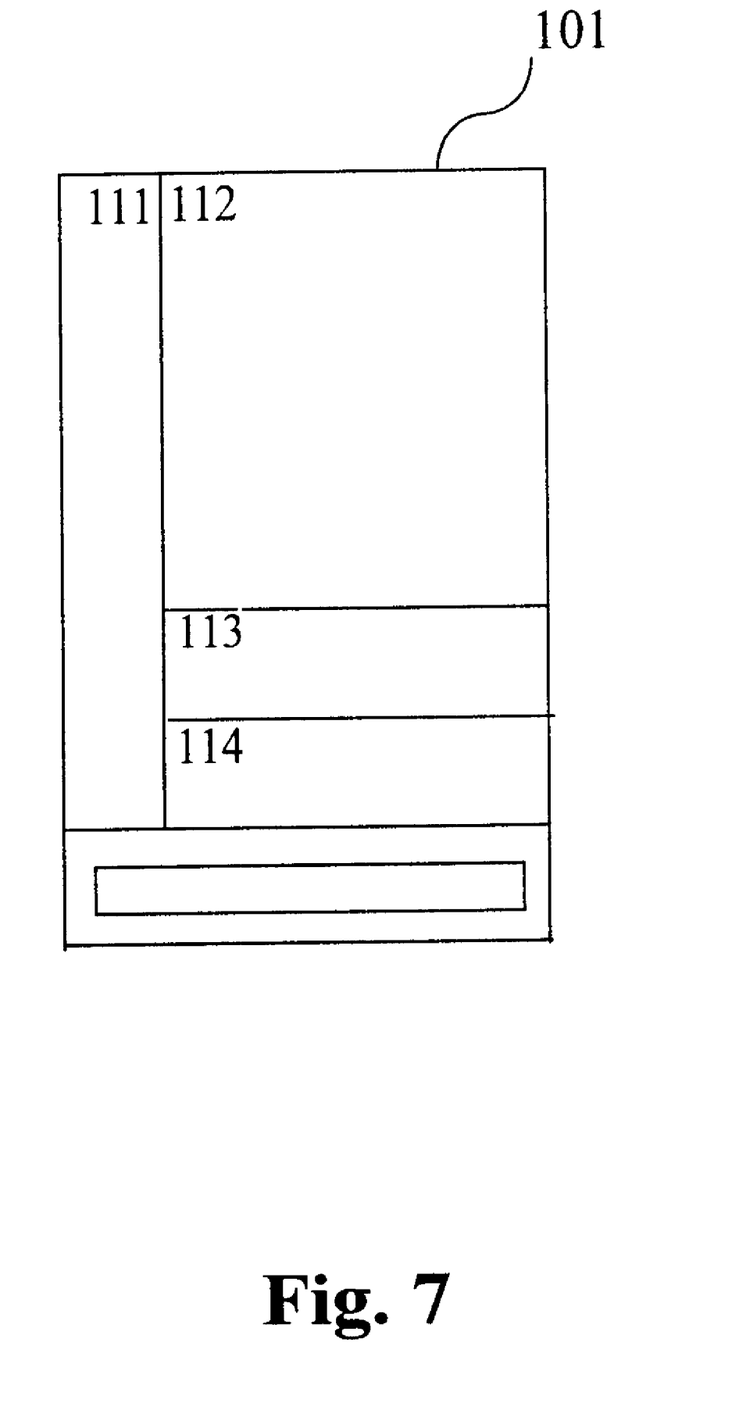
FIG. 7 illustrates a specially prepared sheet of paper in accordance with another preferred embodiment.

FIG. 7 shows a specially prepared sheet of paper in accordance with another embodiment of the invention. In this particular embodiment, rather than using patterns to distinguish between the different regions 111, 112, 113 and 114, location coordinates of the regions are printed as a bar code on the bottom of the paper. The regions are recognised by the user by virtue of a visible number printed in the region. The user selects the desired region for photocopying by pressing an appropriate number on a keyboard of the computer system 600. The apparatus is able to recognise and photocopy the desired region(s) by reading the location coordinates for the desired region(s) stored in the bar code at a predetermined location, preferably on the bottom of the paper 704.

The foregoing only describes a small number of embodiments of the present invention, however, modifications and/or changes can be made thereto without departing from the scope and spirit of the invention.

We claim:

1. A method of copying regions of a printed sheet, the printed sheet comprising a plurality of said regions having recorded therein associated text and/or graphics and information stored on said printed sheet indicating the location of the regions, the method comprising the steps of:

(i) reading said information stored on said printed sheet indicating the location of the regions;

(ii) selecting one or more of said regions and associated text and/or graphics for copying; and (iii) copying said selected regions and associated text and/or graphics in accordance with said information.

2. A method as claimed in claim 1, wherein said information, for each said region comprises a pattern distinctive to said region, and the step (i) comprises the substeps of:

(i)(a) scanning the printed sheet to provide a scanned image of the printed sheet; and (i)(b) detecting and identifying the regions of the scanned image by means of the patterns.

3. A method as claimed in claim 1, wherein said regions include one or more regions of a first type and step (iii) comprises the substep of:

(iii)(a) copying any selected regions of the one or more regions of the first type and the associated text and/or graphics.

4. A method as claimed in claim 1 or 3, wherein said regions include one or more regions of a second type and said step (iii) comprises the substep of:

(iii)(b) preventing the copying of any selected regions of the one or more regions of the second type.

5. A method as claimed in claim 1 or 3, wherein said regions include one or more regions of a third type, and said copying step (iii) comprises the substep of:

(iii)(c) copying said one or more regions of the third type and associated text and/or graphics.

6. A method as claimed in claim 3, wherein said substep (iii)(a) includes the substeps of:

(iii)(a)(1) preventing the copying of any region of the first type which has not been selected.

7. A method as claimed in claim 2, wherein said detecting and identifying step comprises the following substeps:

(i)(b)(1) colour filtering the scanned image in accordance with a predetermined colour;

(i)(b)(2) filtering the colour filtered scanned image with a filter having a high response value to circles of a predetermined size;

(i)(b)(3) generating a binary image having binary pixels where one (1) indicates the presence of a circle of said predetermined colour and size and zero (0) otherwise;

(i)(b)(4) repeating substeps (i)(b)(2) and (i)(b)(3) for a number of predetermined sizes of circles; and (i)(b)(5) assigning a region class to each pixel of the scanned image by determining which binary image has a one (1) closest to that pixel of the scanned image.

8. A method as claimed in claim 1, wherein said information comprises a bar code indicating the location of the regions and said step (i) comprises the substep of:

(i)(a) reading the bar code.

9. A method as claimed in claim 1, wherein said selecting step comprises selecting by user input said one or more of said regions and associated text and/or graphics.

10. A method of blocking regions of a printed sheet, the printed sheet comprising a plurality of said regions having recorded therein associated text and/or graphics and information stored on said printed sheet indicating the location of the regions, the method comprising the steps of:

(i) reading said information stored on said printed sheet indicating the location of the regions;

(ii) selecting one or more of said regions and associated text and/or graphics that are not to be copied;

(iii) preventing the copying of said selected regions and associated text and/or graphics in accordance with said information; and (iv) copying one or more of the non selected regions in accordance with said information.

11. Apparatus for copying regions of a printed sheet, the printed sheet comprising a plurality of said regions having recorded therein associated text and/or graphics and information stored on said printed sheet indicating the location of the regions, the apparatus comprising:

means for reading said information stored on said printed sheet indicating the location of the regions;

means for selecting one or more of said regions and associated text and/or graphics for copying; and means for copying said selected regions and associated text and/or graphics in accordance with said information.

12. Apparatus as claimed in claim 11, wherein said information, for each said region comprises a pattern distinctive to said region, and the reading means comprises:

means for scanning the printed sheet to provide a scanned image of the printed sheet; and means for detecting and identifying the regions of the scanned image by means of the patterns.

13. Apparatus as claimed in claim 11, wherein said regions include one or more regions of a first type and said copying means comprises:

means for copying any selected regions of the one or more regions of the first type and the associated text and/or graphics.

14. Apparatus as claimed in claim 11 or 13, wherein said regions include one or more regions of a second type and said copying means comprises:

means for preventing the copying of any selected regions of the one or more regions of the second type.

15. Apparatus as claimed in claim 11 or 13, wherein said regions include one or more regions of a third type, and said copying means comprises:

means for copying said one or more regions of the third type and associated text and/or graphics.

16. Apparatus as claimed in claim 13, wherein said copying means includes the substeps of:

means for preventing the copying of any region of the first type which has not been selected.

17. Apparatus as claimed in claim 12, wherein said detecting and identifying means comprises:

first filter means for colour filtering the scanned image in accordance with a predetermined colour;

second filter means for filtering the colour filtered scanned image with a filter having a high response value to circles of a predetermined size;

generation means for generating a binary image having binary pixels where one (1) indicates the presence of a circle of said predetermined colour and size and zero (0) otherwise;

repetition means for repeating the operations of the second filter means and generation means for a number of predetermined sizes of circles; and assignation means for assigning a region class to each pixel of the scanned image by determining which binary image has a one (1) closest to that pixel of the scanned image.

18. Apparatus as claimed in claim 11, wherein said information comprises a bar code indicating the location of the regions and said reading means comprises means for reading the bar code.

19. Apparatus as claimed in claim 11, wherein said selection means comprises user input means for selecting said one or more of said regions and associated text and/or graphics.

20. Apparatus for copying regions of a printed sheet, the printed sheet comprising a plurality of said regions having recorded therein associated text and/or graphics and information stored on said printed sheet indicating the location of the regions, the apparatus comprising:

means for reading said information stored on said printed sheet indicating the location of the regions;

means for selecting one or more of said regions and associated text and/or graphics that are not to be copied;

means for preventing the copying of said selected regions and associated text and/or graphics in accordance with said information; and means for copying one or more of the non selected regions in accordance with said information.

21. A computer program product comprising a computer readable medium having recorded thereon a computer program for copying regions of a printed sheet, the printed sheet comprising a plurality of said regions having recorded therein associated text and/or graphics and information stored on said printed sheet indicating the location of the regions, the computer program product comprising:

means for reading said information stored on said printed sheet indicating the location of the regions;

means for selecting one or more of said regions and associated text and/or graphics for copying; and means for copying said selected regions and associated text and/or graphics in accordance with said information.

22. A computer program product as claimed in claim 21, wherein said information, for each said region comprises a pattern distinctive to said region, and the reading means comprises:

means for scanning the printed sheet to provide a scanned image of the printed sheet; and means for detecting and identifying the regions of the scanned image by means of the patterns.

23. A computer program product as claimed in claim 21, wherein said regions include one or more regions of a first type and said copying means comprises:

means for copying any selected regions of the one or more regions of the first type and the associated text and/or graphics.

24. A computer program product as claimed in claim 21 or 23, wherein said regions include one or more regions of a second type and said copying means comprises:

means for preventing the copying of any selected regions of the one or more regions of the second type.

25. A computer program product as claimed in claim 21 or 23, wherein said regions include one or more regions of a third type, and said copying means comprises:

means for copying said one or more regions of the third type and associated text and/or graphics.

26. A computer program product as claimed in claim 23, wherein said copying means includes the substeps of:

means for preventing the copying of any region of the first type which has not been selected.

27. A computer program product as claimed in claim 22, wherein said detecting and identifying means comprises:

first filter means for colour filtering the scanned image in accordance with a predetermined colour;

second filter means for filtering the colour filtered scanned image with a filter having a high response value to circles of a predetermined size;

generation means for generating a binary image having binary pixels where one (1) indicates the presence of a circle of said predetermined colour and size and zero (0) otherwise;

repetition means for repeating the operations of the second filter means and generation means for a number of predetermined sizes of circles; and assignation means for assigning a region class to each pixel of the scanned image by determining which binary image has a one (1) closest to that pixel of the scanned image.

28. A computer program product as claimed in claim 21, wherein said information comprises a bar code indicating the location of the regions and said reading means comprises means for reading the bar code.

29. A computer program product as claimed in claim 21, wherein said selection means comprises user input means for selecting said one or more of said regions and associated text and/or graphics.

30. A computer program product comprising a computer readable medium having recorded thereon a computer program for copying regions of a printed sheet, the printed sheet comprising a plurality of said regions having recorded therein associated text and/or graphics and information stored on said printed sheet indicating the location of the regions, the computer program product comprising:

means for reading said information stored on said printed sheet indicating the location of the regions;

means for selecting one or more of said regions and associated text and/or graphics that are not to be opened;

means for preventing the copying of said selected regions and associated text and/or graphics in accordance with said information; and means for copying one or more of the non selected regions in accordance with said information.

31. A method of printing text and/or graphics, the method comprising the steps of:

displaying an image of a document having a plurality of regions; selecting one or more of said regions of the displayed document;

inputting text and/or graphics for display in the selected regions of the document; and printing said displayed document together with information indicating the location of the regions.

32. A method as claimed in claim 31, wherein said information comprises a different and distinctive pattern for each region, and the printing step comprises the substep of printing the combined images of the patterns and the text and/or graphics.

33. A method as claimed in claim 31, wherein said information comprises a bar code and said printing step comprises the printing of the barcode at a predetermined location.

34. A method as claimed in claim 32, wherein said patterns comprise first patterns pre-assigned for selective copying and second patterns pre-assigned for preventing copying.

35. Apparatus for printing text and/or graphics, the apparatus comprising:

means for displaying an image of a document having a plurality of regions;

means for selecting one or more of said regions of the displayed document;

means for inputting text and/or graphics for display in the selected regions of the document; and means for printing said displayed document together with information indicating the location of the regions.

36. An apparatus as claimed in claim 35, wherein said information comprises a different and distinctive pattern for each region, and the printing means comprises means for printing the combined images of the patterns and the text and/or graphics.

37. An apparatus as claimed in claim 35, wherein said information comprises a bar code and said printing means comprises printing means for printing the barcode at a predetermined location.

38. An apparatus as claimed in claim 36, wherein said patterns comprise first patterns pre-assigned for selective copying and second patterns pre-assigned for preventing copying.

39. A computer program product comprising a computer readable medium having recorded thereon a computer program for printing text and/or graphics, the computer program product comprising:

means for displaying an image of a document having a plurality of regions;

means for selecting one or more of said regions of the displayed document;

means for inputting text and/or graphics for display in the selected regions of the document; and means for printing said displayed document together with information indicating the location of the regions.

40. A computer program product as claimed in claim 39, wherein said information comprises a different and distinctive pattern for each region, and the printing means comprises means for printing the combined images of the patterns and the text and/or graphics.

41. A computer program product as claimed in claim 39, wherein said information comprises a bar code and said printing means comprises printing means for printing the barcode at a predetermined location.

42. A computer program product as claimed in claim 40, wherein said patterns comprise first patterns pre-assigned for selective copying and second patterns pre-assigned for preventing copying.

43. A method of printing text and/or graphics on a sheet, the sheet comprising a plurality of regions adapted to record therein associated text and/or graphics and information therein indicating the location of the regions, the method comprising the steps of:

reading said information stored on said printed sheet indicating the location of the regions;

selecting one or more of said regions for inputting text and/or graphics;

inputting the text and/or graphics; and printing the text and/or graphics in the selected regions in accordance with said information.

44. A method as claimed in claim 43, wherein said information comprises a different and distinctive pattern in each region.

45. A method as claimed in claim 43, wherein said information comprises a bar code at a predetermined location.

46. A method as claimed in claim 44, wherein said patterns comprise first patterns pre-assigned for selective copying and second patterns pre-assigned for preventing copying.

47. Apparatus for printing text and/or graphics on a sheet, the sheet comprising a plurality of regions adapted to record therein associated text and/or graphics and information thereon indicating the location of the regions, the apparatus comprising:

means for reading said information stored on said printed sheet indicating the location of the regions;

means for selecting one or more of said regions for inputting text and/or graphics;

means for inputting the text and/or graphics; and means for printing the text and/or graphics in the selected regions in accordance with said information.

48. Apparatus as claimed in claim 47, wherein said information comprises a different and distinctive pattern in each region.

49. Apparatus as claimed in claim 47, wherein said information comprises a bar code at a predetermined location.

50. Apparatus as claimed in claim 48, wherein said patterns comprise first patterns pre-assigned for selective copying and second patterns pre-assigned for preventing copying.

51. A computer program product comprising a computer readable medium having recorded thereon a computer program for printing text and/or graphics on a sheet, the sheet comprising a plurality of regions adapted to record therein associated text and/or graphics and information thereon indicating the location of the regions, the computer program program product comprising:

means for reading said information stored on said printed sheet indicating the location of the regions;

means for selecting one or more of said regions for inputting text and/or graphics;

means for inputting the text and/or graphics; and means for printing the text and/or graphics in the selected regions in accordance with said information.

52. A computer program product as claimed in claim 51, wherein said information comprises a different and distinctive pattern in each region.

53. A computer program product as claimed in claim 51, wherein said information comprises a bar code at a predetermined location.

54. A computer program product as claimed in claim 52, wherein said patterns comprise first patterns pre-assigned for selective copying and second patterns pre-assigned for preventing copying.

55. A sheet for recording thereon text and/or graphics, the sheet comprising:

a plurality of regions for recording therein associated text and/or graphics; and information stored on said sheet indicating the location of the regions.

56. A sheet as claimed in claim 55, wherein said information comprises a different and distinctive pattern in each region.

57. A sheet as claimed in claim 55, wherein said information comprises a bar code at a predetermined location.

58. A sheet as claimed in claim 56, wherein said patterns comprise first patterns pre-assigned for selective copying and second patterns pre-assigned for preventing copying.

59. A printed sheet having text and/or graphics recorded thereon, the printed sheet comprising:

a plurality of regions having recorded therein associated text and/or graphics; and information stored on said printed sheet indicating the location of the regions.

60. A printed sheet as claimed in claim 59, wherein said information comprises a different and distinctive pattern in each region.

61. A sheet as claimed in claim 59, wherein said information comprises a bar code at a predetermined location.

62. A sheet as claimed in claim 60, wherein said patterns comprise first patterns pre-assigned for selective copying and second patterns pre-assigned for preventing copying.

63. A method of copying a printed sheet, said printed sheet comprising a plurality of regions each identified by indicia incorporated upon said sheet, at least one of said regions including information recorded therein, said method comprising the steps of:

(i) reading said indicia from said printed sheet to identify said regions;

(ii) selecting at least one of said regions for copying, said selection thereby establishing a set of said regions of said printed sheet not desired for copying; and (iii) copying said printed sheet by copying information recorded on said printed sheet except information contained in said set of regions.

64. The method as claimed in claim 63, wherein said set has no members.

65. The method as claimed in claim 63, wherein said printed sheet includes further information recorded on portions thereof not associated with any one of said regions, said further information being copied in step (iii).

* * * * *